Jan. 17, 1933.  F. E. JONES  1,894,563
SANITARY AUTOMATIC POULTRY FOUNTAIN
Filed Feb. 25, 1931  3 Sheets-Sheet 2

Inventor
Frank E. Jones
By Clarence A. O'Brien
Attorney

Jan. 17, 1933. F. E. JONES 1,894,563
SANITARY AUTOMATIC POULTRY FOUNTAIN
Filed Feb. 25, 1931 3 Sheets-Sheet 3
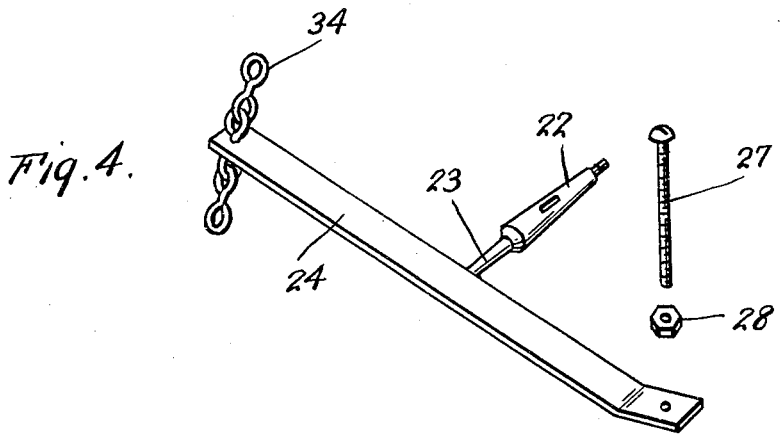
Fig.4.
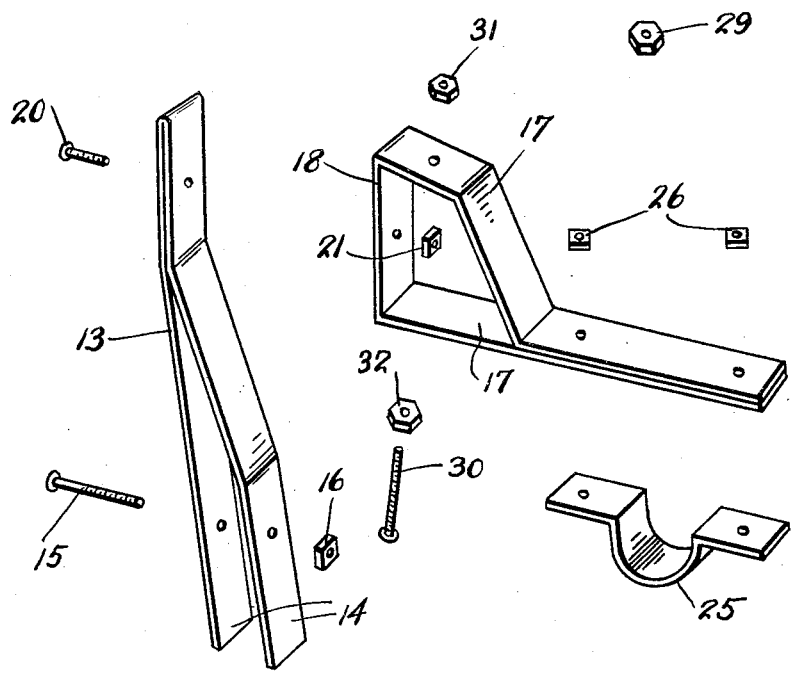
Fig.5.
Inventor
Frank E. Jones
Attorney Patented Jan. 17, 1933

1,894,563

UNITED STATES PATENT OFFICE

FRANK E. JONES, OF SANTA ANA, CALIFORNIA

SANITARY AUTOMATIC POULTRY FOUNTAIN

Application filed February 25, 1931. Serial No. 518,250.

This invention relates to certain new and useful improvements in poultry fountains, and the primary object of this invention is to provide a poultry fountain that is simple and easy to install, consists of relatively few parts, is not likely to get out of order, or clog with sediment, and which is capable of supplying the fowls with clean pure water at all times.

A still further object of the invention is to provide a fountain of the character above mentioned, which will be automatically flushed after being used, and which is so arranged as to render it practically impossible for the fowl to contaminate the water.

A still further object of the invention is to provide a poultry fountain which will not deteriorate by the chemical action of the water.

Other objects and advantages of the invention will become apparent from a study of the following description, taken in connection with the accompanying drawings wherein:

Figure 4 is a perspective view of a valve actuating bar, the same being shown as operatively connected with the valve core, a stop member associated with the bar being also shown separated from the bar.

Figure 5 is a perspective view of a bracket, a support, and a clamp member, the referred to parts being shown separated.

Figure 1:
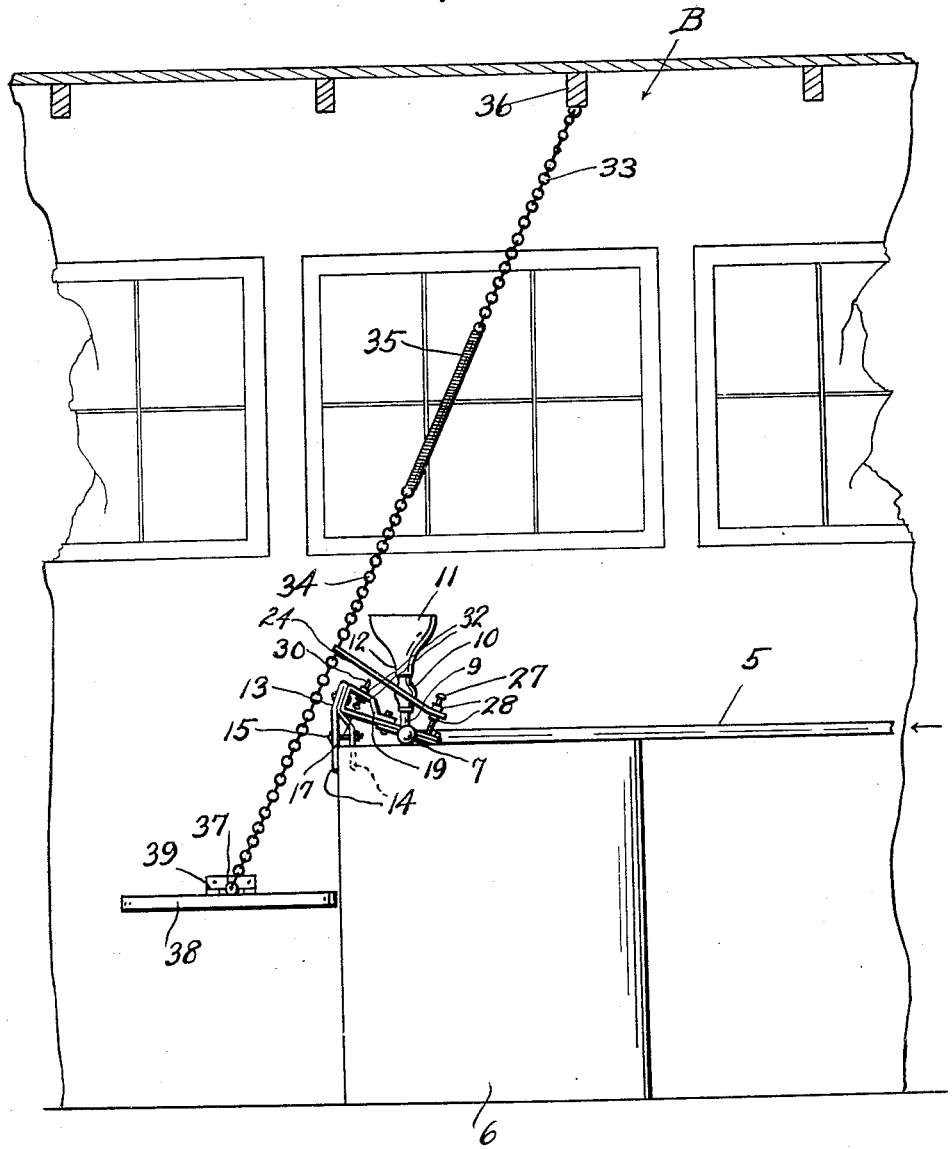
Figure 1 is a sectional elevational view shown through a portion of a building illustrating the arrangement therein of a poultry fountain constructed in accordance with the present invention.
Figure 2:
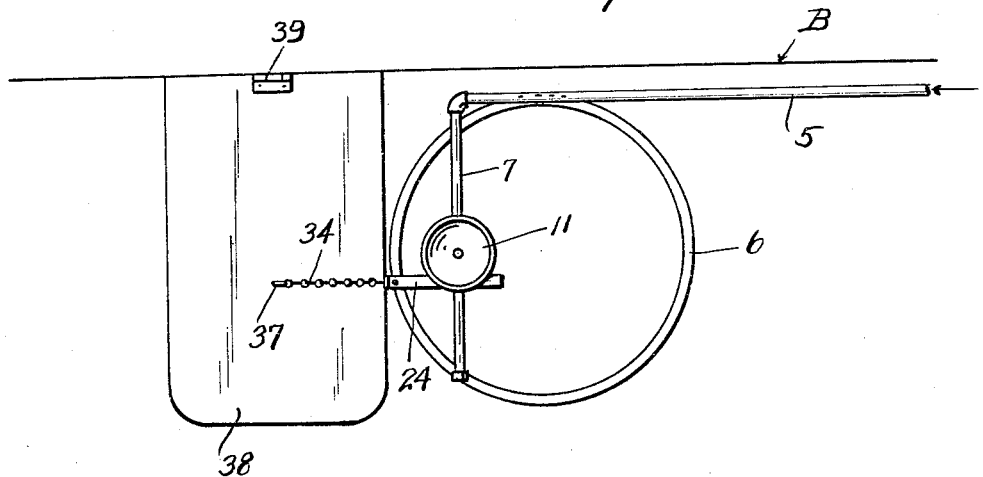
Figure 2 is a top plan view of the poultry fountain per se.
Figure 3:
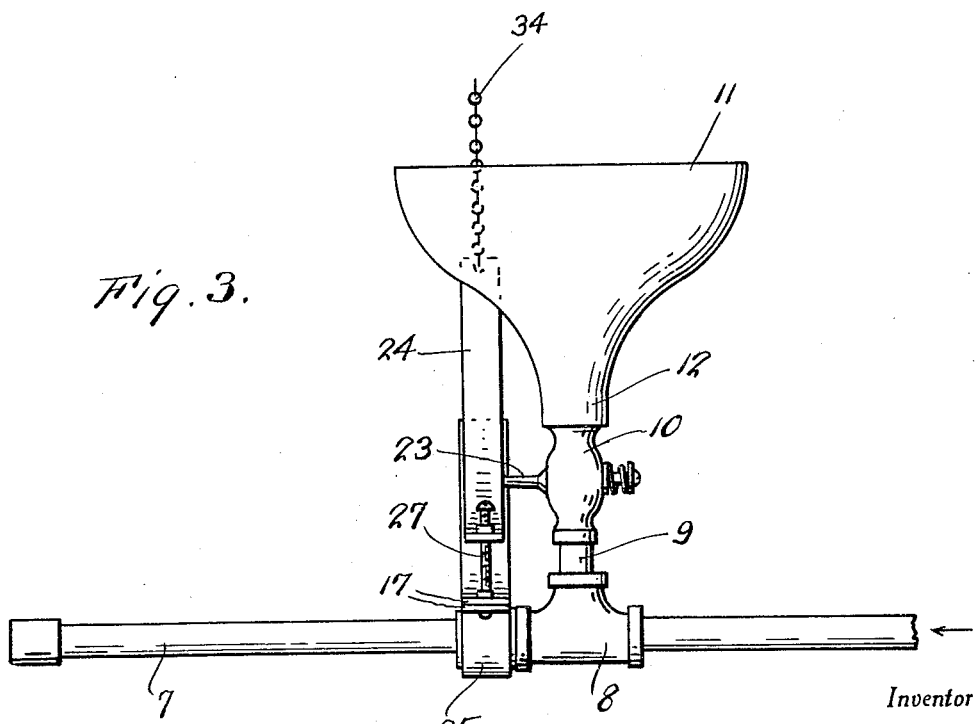
Figure 3 is a side elevational view of the poultry fountain.

Referring more in detail to the drawings, a portion of a building, the same representing a barn, hen house, or the like is designated generally by the reference character B. A water supply pipe for the fountain is designated by the reference character 5. The pipe 5 leads from a suitable source of supply into the building B and is raised above the floor of the building as suggested in Figure 1. The free end of the pipe 5 is supported on the upper edge of the wall of an overflow trough or receptacle 6. The latter is herein shown for the sake of example as cylindrical. At its free end, the supply pipe 5 is coupled to one end of a branch pipe 7 that extends transversely of the overflow trough 6, and the free end of the branch 7 is closed as is apparent.

Arranged in the branch 7 is a T-coupling 8 that has a nipple 9 engaged with the free branch of the T-coupling. The nipple 9 connects the T-coupling 8 with the inlet end of a conventional type of valve 10. A substantially bowl-shaped drinking nozzle 11 merges at its bottom into a cylindrical intake neck 12 that is suitably coupled with the outlet end of the valve 10.

A clamp 13 is preferably formed from a single length of strap iron bent on a transverse line and having one portion thereof offset laterally to provide a pair of clamping jaws 14—14. The clamp 13 is adapted to straddle the wall of the trough or receptacle 6 and the jaws 14 are secured in clamped engagement with the wall through the medium of a bolt 15 passed through alined apertures in the jaws 14 and having a nut 16 threadedly engaged therewith.

A supporting member is also preferably formed from a single length of strap iron bent into a substantial U and comprising a pair of leg portions 17 connected at one end by a web or bight 18. The legs 17 vary in length and the longer of the legs is offset inwardly toward the shorter leg as at 19 and then continued longitudinally in parallelism to said shorter leg. (See Figure 5).

The bight or web portion 18 of the support is secured to the upper end of the clamp 13 through the medium of a bolt 20 and a nut 21 threadedly engaged with the bolt.

The core 22 of valve 10 has the free end of its stem 23 integral or otherwise secured to an intermediate portion of a valve operating bar 24.

Referring to Figure 1, it will be noted that the upper end of the clamp 13 is offset and disposed at an angle to the perpendicular, thus positioning the supporting member mounted on the clamp at an inclination, the said supporting member inclining downwardly toward the trough or receptacle 6. It will be also noted, that when the valve 10 is in an "off" or closed position, the valve actuating bar 24 is also disposed obliquely and in a plane substantially parallel to the plane of the said inclined supporting member.

The said supporting member is secured in this inclined position through the medium of a suitable clamp 25 that embraces a portion of branch 7, the ends of the clamp being bolted to the parallel end portions of the legs 17 through the medium of suitable bolt and nut means 26.

The lower end of valve operating bar 24 is provided with an adjustable stop 27. Said end of bar 24 is slightly offset, and the adjustable stop 27 is in the nature of an elongated bolt passing through an aperture in said offset end, and upper and lower nuts 28 and 29 are threadedly engaged with the bolt 27 for retaining the same at the desired fixed adjustment. The purpose of stop 27 is for limiting rotative movement of the valve core 22 to insure the same being disposed in a valve closing position when the fountain is not in use.

To provide against the valve stem 22 being rotated too far in the opposite direction when being moved to a valve opening position, there is provided on the support, an adjustable stop 30, the same being in the nature of a bolt disposed at an angle to the perpendicular and passed through a suitable aperture in the longer leg 17 at that portion of the leg adjacent the bight or web 18. The bolt 30 is retained in an adjusted position through the medium of upper and lower nuts 31 and 32.

For normally retaining the valve 10 in a closed position, there is provided suitable flexible means in the nature of a pair of chain sections 33 and 34 respectively. Chain sections 33 and 34 are connected by a coil spring 35. Said chain sections 33 and 34 together with spring 35 are arranged obliquely and the free end of the chain sections 33 is suitably anchored to a ceiling joist 36 of the building B.

The free end of chain section 34 is anchored as at 37 to a treadle 38 that is hinged as at 39 to the wall of the building B or any other suitable support adjacent the overflow trough or receptacle 6. Obviously, spring 35 normally exerts an upward pull on chain section 34 which chain section has one link thereof suitably engaged with the free or upper end of the valve operating bar 24 thus normally retaining the parts in the position shown in Figure 1, in which position the valve 10 is closed.

Manifestly, the weight of the fowl on the treadle 38 will cause a downward swinging movement or depression of the treadle thus actuating bar 24, the movement of which is transmitted to the core 22 of valve 10 for moving the core 22 to a valve opening position. When the valve is thus opened, water from the supply pipe will flow upwardly through the valve and into the drinking nozzle 11 to be partaken of by the fowl. Any overflow from the drinking nozzle 11 will of course be caught in the trough or receptacle 6.

Even though I have herein shown and described the preferred embodiment of the invention, it is to be understood that the same is susceptible to changes, modifications and improvements coming within the scope of the appended claims.

Having thus described my invention, what I claim as new is:

1. A drinking fountain comprising in combination an overflow trough, a drinking bowl disposed above said trough, a supply valve connected with said drinking bowl, and including a core provided with a stem, an operating bar operatively engaged with said stem, a member provided with a clamp engaging the wall of said overflow trough, said member and said operating bar provided with cooperating means for limiting movement of said bar when the latter is actuated for moving the valve core to a valve opening or closing position, said means including a stop adjustable on said bar, and engageable with said member, and a second stop on said member remote from the first mentioned stop and to be engaged by said bar when the first mentioned stop is moved out of engagement with said member.

2. A drinking fountain comprising in combination an overflow trough, a drinking bowl disposed above said trough, a supply valve connected with said drinking bowl, and including a core provided with a stem, an operating bar operatively engaged with said stem, a member provided with a clamp engaging the wall of said overflow trough, said member and said operating bar provided with cooperating means for limiting movement of said bar when the latter is actuated for moving the valve core to a valve opening or closing position, said means including a stop adjustable on said bar, and engageable with said member, and a second stop on said member remote from the first mentioned stop and to be engaged by said bar when the first mentioned stop is moved out of engagement with said member, a treadle, and means operatively connecting said treadle and said bar, said means including means acting on said bar for urging the first mentioned stop into engagement with said member.

3. A drinking fountain comprising in combination an overflow trough, a drinking bowl disposed above said trough, a supply valve connected with said drinking bowl, and including a core provided with a stem, an operating bar operatively engaged with said stem, a member provided with a clamp engaging the wall of said overflow trough, said member and said operating bar provided with cooperating means for limiting the movement of the bar when the latter is actuated for moving the valve core to a valve open or closing position, said means including a stop adjustable on said bar, and engageable with said member, and a second stop on said member remote from the first mentioned stop and adapted to be engaged by said bar when the first mentioned stop is moved out of engagement with said member, a treadle pivotally mounted adjacent to said trough, a chain connected at one end to said treadle and to a stationary point at its other end and having inserted in its length a resilient member, said operating bar having an aperture therein to engage one of the chain sections whereby said resilient member normally holds said operating member in a position to close said valve and upon a downward movement of said treadle said valve is forced in an open position.

In testimony whereof I affix my signature.

FRANK E. JONES.